HIRAM C. STOUFFER.

Locking Washers.

No. 125,226.                  Patented April 2, 1872.

125,226

UNITED STATES PATENT OFFICE.

HIRAM C. STOUFFER, OF EAST LEWISTOWN, OHIO.

IMPROVEMENT IN LOCKING-WASHERS.

Specification forming part of Letters Patent No. 125,226, dated April 2, 1872.

Specification describing an Improved Nut-Lock, invented by HIRAM C. STOUFFER, of East Lewistown, Mahoning county, Ohio.

This invention consists of a washer or nut-lock having a circular series of ratchet-teeth raised on its bearing side, and surrounding the hole through which the bolt passes, in combination with inclined lips, one at each corner of the nut side of the washer, all as hereinafter more fully described.

Figure 1:
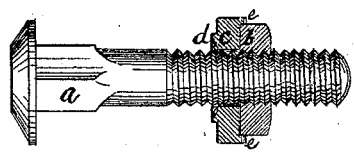
Figure 2:
Figure 3:
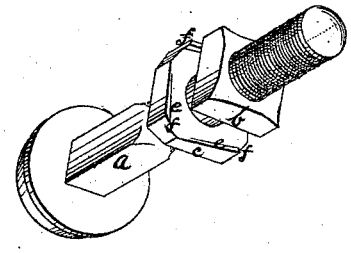

Figure 1 is an elevation of the bolt, with sections of the nut and washer. Fig. 2 is a top view of the washer with a section of the bolt; and Fig. 3 is a perspective view of bolt, nut, and washer.

$a$ is the bolt; $b$, the nut; and $c$, the washer or nut-lock. $d$ are the ratchet-teeth aforesaid, raised in a circular series on the bearing side of the washer $c$, and $e$ are the inclined lips aforesaid, the same projecting from the nut side of the washer, one at each corner. When the nut $b$ is in contact with the washer the lips $e$ are outside of the nut, and when the latter is turned forward its corners, pressing against the angles $f$ of the lips $e$, carry the washer around with the nut until the washer is screwed firmly against the wood through which the bolt passes, and the teeth $d$ are embedded in the wood; but when the nut seeks to turn itself back under the various jars to which it is subjected, or when it is sought to turn it back, the corners of the nut strike the inclines of the lips $e$ and press the washer against the wood, and the teeth $d$ prevent the washer from turning back, and the washer prevents the nut from turning back. The lips $e$ being on the four sides of the washer, the strain of the nut is communicated equally to each lip, and the resistance of the washer is distributed equally to the four sides of the nut, so that there is no possibility of such resistance being overcome, or of bending the bolt or stripping the thread; and the improvements herein described being all in the washer, it can be used with any ordinary nut, whether new or old. The washer can be turned back, when necessary, by means of a wrench.

I claim as my invention—

The washer $c$ having a circular series of ratchet-teeth, $d$, raised on its bearing side, in combination with inclined lips $e$ extending from the corners of the washer, on the nut side thereof, and inclosing a sufficient space between the lips to receive the nut, all as specified.

HIRAM C. STOUFFER.

Witnesses:
GEO. E. BROWN,
THOS. JEWELL.